W. H. GADE.
EXCAVATING SCOOP.
APPLICATION FILED SEPT. 18, 1911.

1,014,293.

Patented Jan. 9, 1912.

Witnesses

W. H. Gade, Inventor by

Attorneys

UNITED STATES PATENT OFFICE.

WILLIAM H. GADE, OF IOWA FALLS, IOWA.

EXCAVATING-SCOOP.

1,014,293.   Specification of Letters Patent.   Patented Jan. 9, 1912.

Application filed September 18, 1911. Serial No. 649,989.

*To all whom it may concern:*

Be it known that I, WILLIAM H. GADE, a citizen of the United States, residing at Iowa Falls, in the county of Hardin and State of Iowa, have invented a new and useful Excavating-Scoop, of which the following is a specification.

The present invention relates to improvements in excavating scoops, and the primary object of the invention is the provision of a scoop especially designed for use in drainage excavating and adapted to be attached to a boom, a hoist rope and a drag rope being connected thereto with the interposition of a fixed length of flexible connection which is adapted to be held taut by the pulling of said hoist rope and drag rope to permit the scoop to assume a dirt receiving or digging position and a dumping position, a peculiar form of mechanism being designed to operate simultaneously with the dumping mechanism to clean the earth from the rear wall and bottom of the scoop to prevent the adherence of the dirt at such points.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
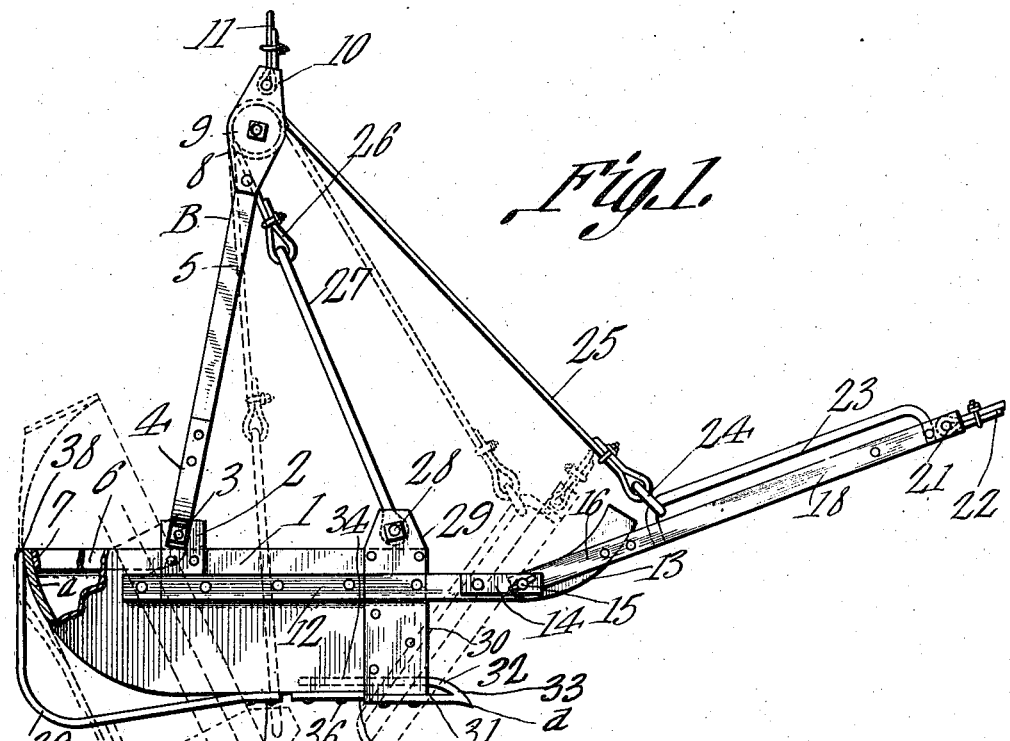
Figure 2:
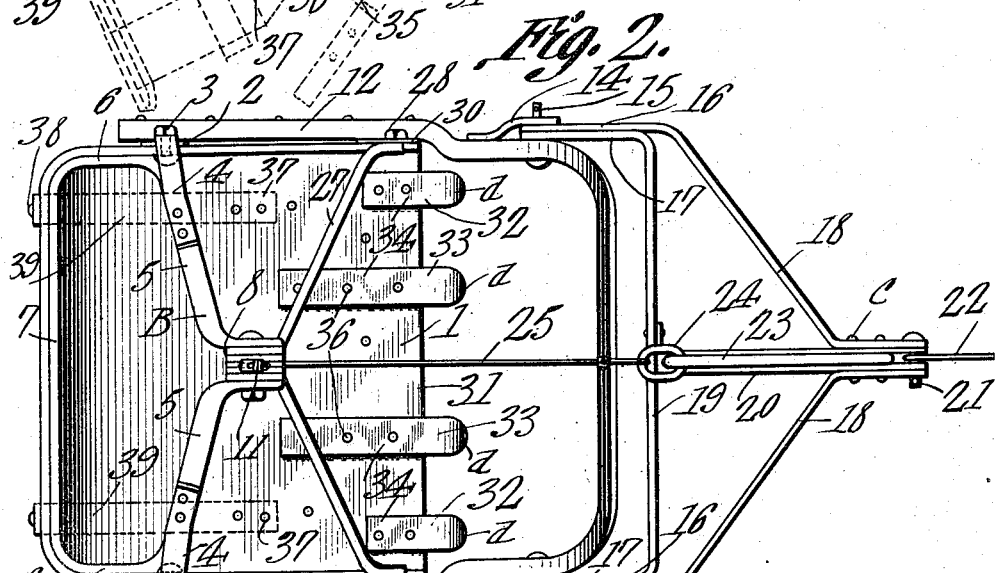

In the drawings—Figure 1 is a side elevation of the scoop in the position which it and its operating parts assume when being filled, dotted lines showing the dumping position of the scoop and its parts. Fig. 2 is a top plan view of the scoop in filling position.

Referring to the drawings, the numeral 1 designates the scoop which as shown has upstanding therefrom, at the rear portion and upper edge and beyond the center of gravity two oppositely disposed lugs 2, through each of which is passed the bolt 3 for connecting the lower ends 4 and the brackets 5, which form with said lower ends 4 a fork for the support of the bail B. Formed integral with the lower end of the terminals 4 of the bail and at an angle thereto, slightly greater than a right angle, are the arms 6, which are bridged and connected together by means of the bar 7, which forms a scraper blade, the same being normally in contact with the surface *a* of the rear wall of the scoop, as clearly shown in section in Fig. 1. Connected between the upper terminals of the bail is a pulley sheave 8, carrying the pulley 9 and connected to bridge the extreme upper ends of the sheave and terminals of the bail is a pin or bolt 10, which connects the main hoist line 11 thereto. The parallel arms 12 of the bail 13 are secured rigidly to the outer walls of the scoop near the upper edge thereof, the forward end of the bail as at 13 projecting slightly upward as shown in elevation in Fig. 1, and forming a means to assist in the cutting action of the scoop as will presently appear. Connected to the bail are the brackets 14, a pin 15 being connected to the bail and through said brackets and forming a pivotal connection for the terminals 16 and 17 of the main dragging bail 18 and the auxiliary reinforcing bail 19, said auxiliary bail 19 being connected to the main bail 18 through the medium of the bar 20, whose forward ends and the forward ends of the bail 18 are connected together by means of the rivets *c*, thus rigidly connecting the main bail 18 and the auxiliary bail 19 together for movement in unity.

Mounted on the outer end of the bail 18 is a pin 21, to which is connected the drag line 22, and disposed above and in parallel to the bar 20 is a rod 23, which provides a slide for the reception of the ring 24, flexibly mounted in the lower end of the short cable 25, which passes up and over the pulley 9 and has its end 26 flexibly connected to the intermediate bail 27, and has its lower end connected by means of the bolts 28 to the upper projecting ends 29 of the U-shaped cutter blade 30. This U-shaped cutter blade 30 is riveted upon the sides and the bottom of the forward edge of the scoop and forms a reinforcement as well as a cutter for the earth entering the same, the adjoining portion 31 thereof being in line with the front edge of the scoop as clearly shown in Fig. 2. Disposed in parallel and having their cutting ends *d* projecting beyond the forward edge of the scoop and the blade 31, are a plurality of short digging teeth 32 and intermediate long digging teeth 33, each of said teeth being made from a single piece of metal bent upon itself to form a reduced downwardly turned cutting end *d* and the parallel and spaced terminals 34 and 35, which are adapted to span the thickness of the metal of the scoop and also the blade 31 and be secured in place by means of the rivets 36, thus providing a reinforcement means for the flexible portion of the scoop and assisting the transverse portion 31 of the blade in such action.

Connected at points 37 and 38 to the underside and rear wall of the scoop and at equi-distant points are the shoes 39, the heel portion of which is directly below the junction of the bottom wall with the rear wall of the scoop and in such position as to when the scoop is dragged along the surface to tilt the cutting edge 31 and the teeth $d$ downwardly so that when the drag line 22 is pulled upon, the cutting edge of the scoop will be projected into the surface so as to cut the dirt and to cause the same to be delivered to and within the scoop, the parts during this operation being in the position as shown in Fig. 1.

From the foregoing description, taken in connection with the drawings, it is evident that with a scoop constructed as herein set forth, that is, with the steel shoes 39, it is evident when dragged along the ground, that the digging teeth 32 and 33 and the cutting edge of the scoop will enter the surface, the scoop will be filled by being drawn forward by the drag cable 22. It is also evident that when the scoop is filled it is removed from the excavation by means of the cable 11 which is ordinarily carried to dumping position by means of a swinging boom, not shown, and that when the drag cable 22 is loosened, the weight of the scoop and the dirt therein, acting through the bail 27 and flexible connection 25, will cause the ring 24 to slide upon the rod 23 outwardly toward the connection of the drag cable 22, the bail B moving forwardly as the flexible connection 25 passes over the pulley 9 so that the bail 27 will be lowered and the entire weight of the scoop and dirt will swing upon the pivot 2 of the bail B, so that the front of the scoop will swing downwardly and the dirt be forced therefrom, this action simultaneously tilting the scraping blade 7 upon the surface $a$ at the rear of the scoop so as to prevent the adherence of the dirt to the rear wall and the bottom of the scoop at that point.

By producing a small scoop or excavator with the cleaner 7, a more rapid action is posible, and by means of the shoes 39 which hold the scoop at any given angle and prevent the scoop from slipping into the bottom of the ditch sidewise, it is evident that a very practical drainage and ditch excavating scoop is provided, and that by making the teeth 32 and 33 of a single piece of metal bent upon itself, that the same will assist in reinforcing the flexible edge of the scoop and provide a sharp cutting edge for cutting into a hard surface.

What is claimed is:

1. A drag line excavating scoop, having a body, a lifting bail pivotally connected to the upper edge thereof to the rear of the center of gravity, another bail rigidly connected to project beyond the open front end of said body, a drag line bail pivotally connected to the rigid bail and extending forwardly of said rigid bail, a rod carried by the drag line bail and in line with the drag line at all times, and a flexible connection of a fixed length having one end fast to the forward upper ends of the body, the body portion being slidable through the apex of the lifting bail while the other end is slidably connected to the rod of the drag line bail.

2. A drag line excavating scoop, having a body, a lifting bail pivotally connected to the upper edge thereof to the rear of the center of gravity, another bail rigidly connected to project beyond the open front end of the body, a drag line bail pivotally connected to the rigid bail and extending forwardly of the rigid bail, a rod connected to and carried by the drag line bail and disposed in line with the drag line at all times, another bail having its terminals pivoted to the upper edges of the body, a pulley disposed at the apex of the lifting bail, a flexible connection having one terminal connected to the bail pivoted to the front edge of the body and passing through said pulley, and a ring carried in the other terminal of the flexible connection mounted upon the rod of the drag line bail.

In testimony that I claim the foregoing as my own, I have hereto affixed my signature in the presence of two witnesses.

WILLIAM H. GADE.

Witnesses:
R. O. FOWLER,
J. H. LARSON.